Feb. 23, 1943.　　　G. T. McCLURE　　　2,311,851
CHECK VALVE DEVICE
Filed Nov. 27, 1941
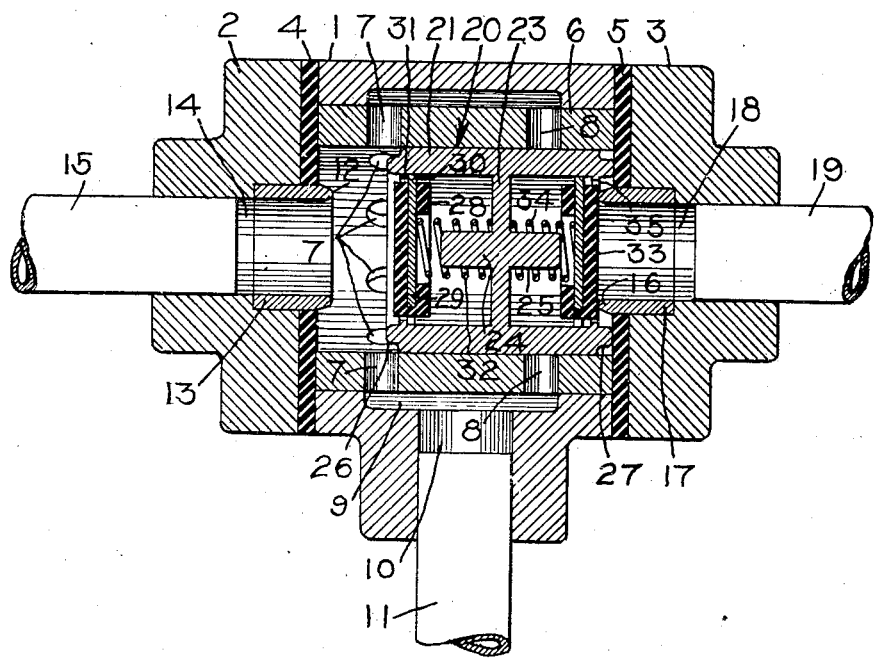
INVENTOR
GLENN T. McCLURE
BY
*A. M. Higgins*
ATTORNEY Patented Feb. 23, 1943

2,311,851

UNITED STATES PATENT OFFICE 2,311,851

CHECK VALVE DEVICE

Glenn T. McClure, McKeesport, Pa., assignor to The Westinghouse Air Brake Company, Wilmerding, Pa., a corporation of Pennsylvania Application November 27, 1941, Serial No. 420,616

4 Claims. (Cl. 251—118)

This invention relates to fluid actuated devices and more particularly to a double check valve device adapted to control the flow of fluid under pressure between either one of two separate pipes and a third pipe.

The principal object of the invention is to provide an improved double check valve device.

One type of double check valve device heretofore commonly employed comprises a casing, within which is disposed a cylindrical bushing, which bushing is provided, at a certain distance from each end, with ports leading from the interior thereof to a common outlet pipe. The bushing is closed at each end by a cap member and the cap member at each end is provided with a through passage leading from the interior of the bushing to a separate pipe. Each of these cap members may be removably secured to the casing in any suitable manner.

Contained in the bushing is a double seated piston valve member adapted to open communication between one of said pipes and the port at the same end of the bushing leading to the common pipe and to close communication between the port at the other end of the bushing leading from the common pipe to the other pipe, and is movable to the opposite end of the bushing to reverse the connections. As is well known in the art, the double seated piston valve member, of double check valve devices of this type, is actuated from one position to the other in the bushing by means of a preponderance of pressure on one end or the other of the valve.

In double check valve devices of this type there is provided interiorly of each end thereof a sealing gasket which is usually made of a rubber composition. The valve member of the device is slidable back and forth in the bushing and is provided at each end with an annular seating rib or valve which is adapted to engage one of the gaskets to provide an air tight seal. In practice one side of the valve member may be subject to fluid at atmospheric pressure while the other side is subjected to a much higher pressure and since the valve member must be readily movable from one control position to the other, the member will, under the influence of this higher pressure, move quickly to its seated position. The valve member has considerable weight and strikes the gasket with considerable force. Since the seating face of the sealing ribs must not be wide and the sealing gaskets must not be too hard the valve member has a tendency to cut or so damage the gasket that leakage past the sealing rib occurs.

Another object of the invention is to provide a double check valve device which will eliminate the undesirable feature above mentioned.

In accordance with the invention the improved check valve device is provided with a pair of resiliently mounted valve elements. One of these valve elements is carried at each end of a movable member, and each is adapted to seat on a fixed annular seat rib to provide an air tight seal. The movable member is cushioned in its traverse from one position to the other and is provided at each end with a relatively wide seating rib which seats on the usual sealing gasket and thereby serves to limit travel of the movable member.

In the usual check valve device of the type above mentioned the operating clearance between the double seated piston valve member and the bushing in which the member is slidably mounted can not be held too close for the reason that free movement of the valve member in the bushing is desirable. If, however, the clearance between the valve member and bushing should be excessive, due to poor workmanship or to wear, the piston may become cocked in the bushing and as a result, when moved into engagement with the gasket, may not seal properly and thereby permit leakage past the valve.

Another object of the invention is to provide a double check valve device which will insure the proper seating of the valve to provide an air tight seal even though the valve member may cock, thus eliminating the above mentioned difficulty.

In the accompanying drawing the single figure is a sectional view of a double check valve device constructed in accordance with my invention.

The check valve device comprises a hollow body portion 1 which, as shown in the drawing, may be open at both of its ends, one of these open ends being closed by a cap 2 and the other end being closed by a cap 3. Interposed between the portion 1 and the caps 2 and 3 are gaskets 4 and 5 respectively. The caps are secured to the portion 1 in the usual manner by means of bolts (not shown).

Contained within and having a press fit with the casing portion 1 is a cylindrical bushing 6 which, adjacent one end is provided with a plurality of fluid conducting ports 7 and which adjacent the other end is provided with a plurality of ports 8. All the ports 7 and 8, at their outer ends communicate with a circular chamber 9 which is in constant open communication with a passage 10 and pipe 11 through which fluid under pressure may be supplied to and released from a device to be operated, such for instance as a brake cylinder or a relay valve device.

The cap 2, at one end of the body portion 1, is provided with a seat rib 12 which, as shown, constitutes one end of a short tubular member 13 having a press fit with the wall of a recess provided in the cap. The interior of the member 13 registers with a passage 14 to which there is connected a fluid supply and release pipe 15. The cap 3 is provided with a like construction having a seat rib 16 provided on a tubular member 17 which corresponds to the tubular member 13. The interior of the member 17 registers with a passage 18 to which there is connected a fluid pressure supply and release pipe 19. The members 13 and 17 extend through suitable openings in the gaskets 4 and 5, respectively, so that their seat ribs 12 and 16 will be located beyond the inner surfaces of the gaskets.

Slidably mounted in the bushing 6 for movement longitudinally thereof in either direction is a check valve assemblage 20 which when moved in one direction establishes communication between the passages 14 and 10 and cuts off communication from the passage 10 to the passage 18, and which when moved in the other direction establishes communication between the passages 10 and 18 and cuts off communication between the passages 10 and 14.

The valve assemblage may comprise an annular valve body member 21 which has a sliding fit with the interior surface of the bushing 6. This member, intermediate its ends, is provided with an interior wall or spring seat 23 having axially disposed longitudinally extending spring guides 24 and 25 arranged one on each side thereof.

One end of the member is provided with a wide flat annular seat rib 26 which is adapted to seat on the gasket 4. The other end of the member is provided with an identical seat rib 27 which is adapted to seat on the gasket 5. It should here be mentioned that if desired the width of the seat rib may be increased up to the full thickness of the annular wall of the member, although in most cases this will be unnecessary since in practice it is found that the seat ribs as shown do not damage the gaskets 4 and 5.

Slidably guided in one end of the member 21 is a valve 28 made of rubber composition having embedded therein a metal plate 29 having spaced peripheral guide lugs 30 which project through the rubber composition and which are adapted to slidably engage the inner surface of the member. These guide lugs interlock with an annular stop rib or lug 31 located interiorly of the member so as to prevent separation of the valve and member. Interposed between and operatively engaging the rear face of the valve and one side of the spring seat 23 is a relatively light spring 32 which, at all times, biases the valve in a direction toward the stop lug 31.

The stop lug 31 is located rearwardly of the face of the seat rib 26 so as to maintain the valve within the end member where it will be protected against damage during assembly of the valve parts.

With the valve assemblage in the position in which it is shown in the drawing the valve 28 is maintained so positioned that when the valve assemblage is moved toward the left the valve will engage and seal on the seat rib 12. The member 21 will then move relative to the valve and therefore against the opposing pressure of the spring 32 until such time as the seat rib 26 seats on the gasket 4 and brings the member to a stop.

The other end of the member 21 is provided with an identical valve arrangement in which the valve is indicated by the reference character 33, the spring by the reference character 34 and the stop lug for the valve by the reference character 35.

It should here be mentioned that both ends of the valve assemblage are identical but the several parts thereof have been given different reference characters so as to simplify the following description of the operation of the valve device.

Operation

Assuming the several parts of the valve device to be in the position in which they are shown in the drawing, the pipe 15 and passage 14 connected to the atmosphere, and the pipe 19 and passage 18 supplied with fluid under pressure. Fluid under pressure supplied to the passage 18 acting over the inner seated area of the face of the valve 33 causes the valve to move away from the seat rib 16 against the opposing pressure of spring 34. Fluid under pressure flowing past the unseated valve and acting over the greater portion of the adjacent end of the member 21 causes the member to quickly move toward the left hand unseating the seat rib 27 from the gasket 5.

The valve assemblage now moves as a whole and the member 21 first laps the ports 7 in the bushing and thereby cuts off free communication from the pipe 11 and passage 10 to the passage 14 and pipe 15. At substantially the same time as the ports 7 are lapped the member uncovers the ports 8 in the bushing, thereby permitting the flow of fluid under pressure from the pipe 19 and passage 18 to the passage 10 and pipe 11.

When the ports 8 are thus uncovered the valve 28 seals against the seat rib 12 and prevents leakage of fluid from the pipe 11 and passage 10 to the passage 14 and pipe 15 after which the member 21 moves relative to this valve until the seat rib 26 seats on the gasket 4 and brings the member to a stop.

It will be understood that the seat rib 26 being wide and flat is not liable to damage the gasket 4 especially in view of the fact that the spring 32 will dampen to some degree the force with which the rib strikes the gasket.

When the pipe 19 is at atmospheric pressure and fluid under pressure is supplied to pipe 15 and passage 14 the valve assemblage will move to its right hand position in which position it is shown in the drawing. With the valve assemblage thus positioned the ports 8 in the bushing are lapped and the ports 7 are uncovered thus free communication is cut off between passage 10 and passage 18 and free communication established between passage 10 and passage 14. It will be understood that the several parts of device function, upon movement of the valve assemblage to its right hand position, in the same manner as described in connection with the movement of the valve assemblage to its left hand position.

Having now described my invention, what I claim as new and desire to secure by Letters Patent, is:

1. A valve device comprising a casing having two fluid conducting communications therethrough, sealing elements carried one at each end of said casing and surrounding said fluid conducting communications, a valve body slidable longitudinally of the casing, said valve body having two chambers extending longitudinally thereof, a wall separating the inner ends of said chambers, a seat rib at the outer end of each chamber and each adapted for seating engagement with one of the sealing elements, a valve contained in each chamber, a stop member contained in each chamber for maintaining each valve rearwardly of the respective seat rib, valve seat ribs carried one at each end of the casing and surrounding said fluid conducting communications, and adapted to be engaged by one of said valves to close one of said communications, said valve body being movable relative to the seated valve, and means for yieldably resisting movement of the valve body relative to the valve during the traverse of the valve body toward the sealing element.

2. A double check valve device for controlling communication through a plurality of ports, said check valve device comprising a casing, sealing elements carried at opposite ends of said casing and surrounding two of said ports, a hollow valve body slidable longitudinally of the casing and adapted at each end to engage the corresponding sealing element to limit movement of said body, a pair of valves contained in said body, each being located and maintained rearwardly of one end of said valve body, seat ribs carried one at each end of the casing and surrounding said two ports, and adapted to be engaged by the corresponding valve to close communication through at least one of said ports, said valve body being movable relative to the seated valve, and a spring for yieldably resisting movement of the valve body relative to the valve during the traverse of the valve body toward the sealing element.

3. A double check valve device for controlling communication through a plurality of ports, said check valve device comprising a hollow casing, cover plates for closing the opposite ends of said casing and containing two of said ports, sealing elements interposed between the ends of the casing and the cover plates and surrounding said cover ports, a valve assembly slidably mounted in said casing to close communication between either one of said cover ports and a third port in said casing, said valve assembly comprises a valve body having two chambers extending longitudinally thereof, a wall separating the inner ends of the chambers, a seat rib at the outer end of each chamber and each adapted to engage one of the sealing elements to limit movement of said valve assembly, a resiliently mounted valve contained in each chamber, and a valve support contained in each chamber and located rearwardly of the seat rib at each end of said body, each of said valves being adapted to engage a sealing rib carried by the cover plate and surrounding the cover port at each end of the casing to provide a leak-proof seal for cutting off communication from either one of said two ports and said third port.

4. A valve for a fluid pressure controlling valve device comprising a hollow body adapted at each end to engage a sealing element to limit movement of said body, a pair of valves contained in said body, a pair of valve stops contained in said body, one of said stops being located a certain distance rearwardly of one end of said body and the other located a certain distance rearwardly of the opposite end of said body, each of said valves being adapted to engage a fixed seat rib of the valve device, and resilient means contained in said body tending at all times to urge said valves into engagement with said stops.

GLENN T. McCLURE.